B. PICKERING.
VEHICLE BRAKE.
APPLICATION FILED MAY 19, 1916.
1,217,057.
Patented Feb. 20, 1917.
2 SHEETS—SHEET 1.
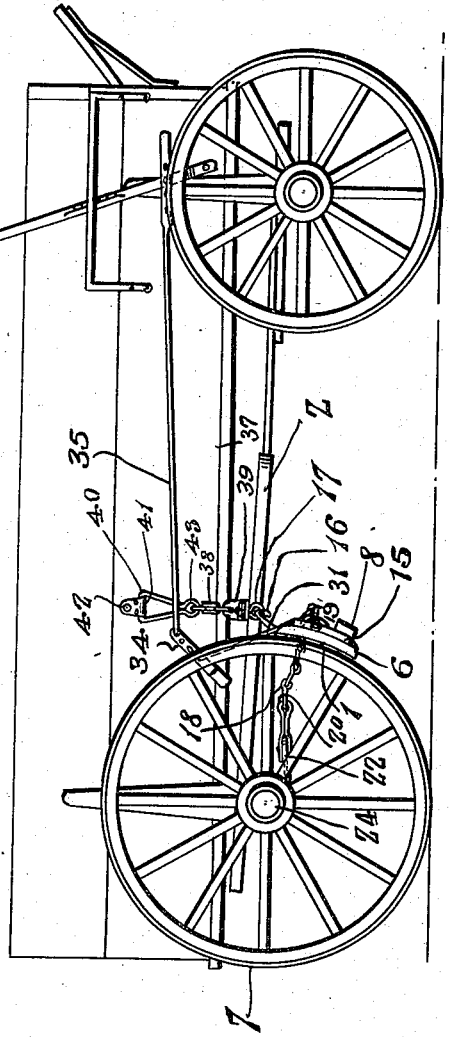
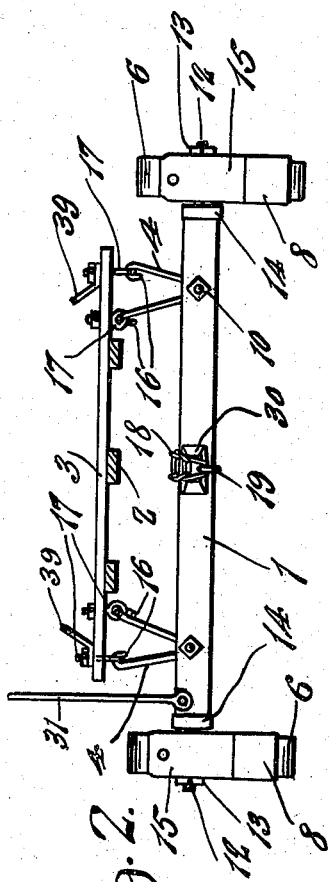
Witnesses
Inventor
B. Pickering
By
Attorney

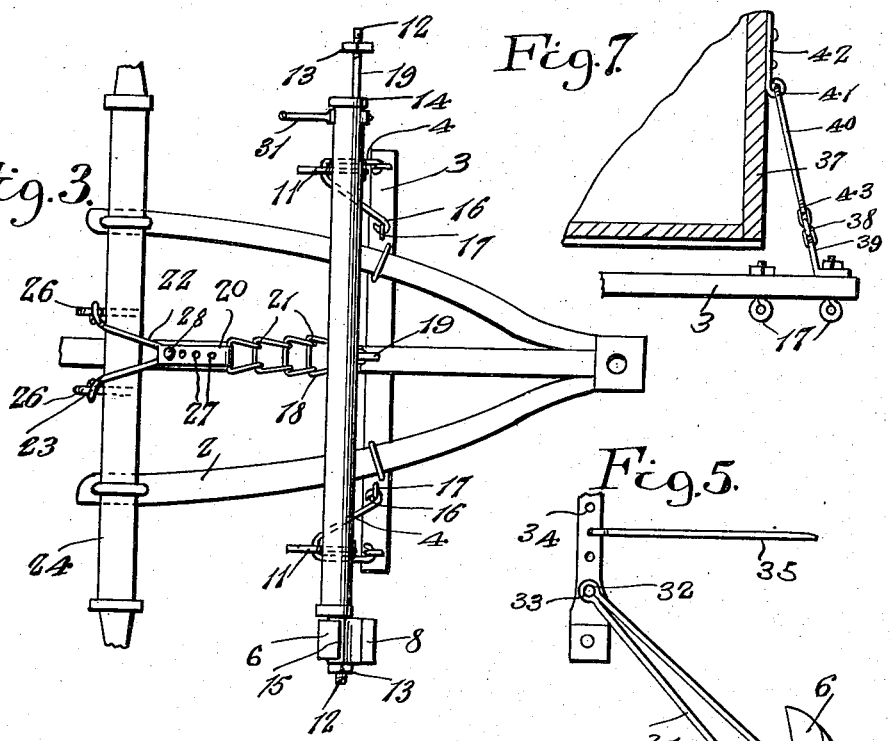

UNITED STATES PATENT OFFICE.

BYRON PICKERING, OF KISSIMMEE, FLORIDA.

VEHICLE-BRAKE.

1,217,057.  Specification of Letters Patent.  Patented Feb. 20, 1917.

Application filed May 19, 1916. Serial No. 98,590.

*To all whom it may concern:*

Be it known that I, BYRON PICKERING, a citizen of the United States, residing at Kissimmee, in the county of Osceola and State of Florida, have invented certain new and useful Improvements in Vehicle-Brakes; and I do hereby declare the following to be a full, clear, and exact description of the invention, such as will enable others skilled in the art to which it appertains to make and use the same.

The invention relates to improvements in vehicle brakes.

The object of the present invention is to improve the construction of vehicle brakes and to provide a simple, practical and efficient vehicle brake of strong and durable construction designed for use on various kinds of vehicles such as wagons, electric cars, steam railroad cars and the like and capable of exerting a great amount of force against the wheels whereby an effective braking action is secured at the expenditure of a comparatively small amount of force applied to the operating mechanism of the brake.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings

Figure 1 is a side elevation of a brake constructed in accordance with this invention and shown applied to a wagon, Fig. 2 is a transverse sectional view of the same, Fig. 3 is a reverse plan view of the rear portion of the running gear and brake mechanism, Fig. 4 is a central longitudinal sectional view of the same, Fig. 5 is a detail sectional view illustrating the construction of the means for rotating the transverse floating brake roller.

Fig. 6 is a detail sectional view illustrating the manner of mounting the brake shoe, Fig. 7 is a detail view of one of the side supports.

Like numerals of reference designate corresponding parts in the several figures of the drawings.

In the accompanying drawings in which is illustrated the preferred embodiment of the invention, the vehicle brake comprises in its construction, a transversely disposed double eccentric floating roller 1 designed to be constructed of wood or any other suitable material and extending across the running gear of a vehicle below the rear hound 2 and hung from a transversely supporting bar or member 3 by approximately V-shaped links 4 having upwardly diverging sides and adapted to hold the transverse shaft or roller against movement laterally of the running gear whereby the brake shoes 6 are caused to engage the wheels 7 squarely and are prevented from moving out of alinement with the said wheels. The brake shoes 6 which are provided at their lower portions with suitable weights 8 are mounted intermediate of their ends on horizontal pivots 9 extending into the terminal portions of the shaft or roller 1 and held against outward movement by the shanks 10 of eye bolts 11 into which the lower ends of the approximately V-shaped links are engaged. The pivots 9 are threaded at their outer ends 12 for the reception of nuts 13 but any other suitable fastening means may of course be employed and the nuts may be employed and the nuts may be locked on the outer ends of the pivots by suitable fastening devices. The eye bolts 11 which may be provided with a plurality of eyes to permit an adjustment of the supporting links are disposed at points diametrically opposite the pivots of the brake shoes and when the brake shoes are out of engagement with the wheels and at the limit of their forward movement, their pivots are located at the front of the roller and the eyes of the said eye bolts are located at the back of the roller. When the roller is constructed of wood its terminal portions are designed to be reinforced by suitable sleeves or ferrules 14 and the brake shoes may consist of blocks mounted in casings or holders 15 composed of spaced sides and a connecting portion. The weights which may be of any desired construction are attached to the brackets or holders at the lower portions thereof and are located in advance of the blocks as clearly illustrated in Fig. 6 of the drawings. The upper portions or terminals of the sides of the V-shaped links or hangers 4 are provided with hooks 16 which are linked into eye bolts 17 piercing the transverse supporting bar 3 at the lower face thereof.

The transverse shaft or roller which may be circular or octagonal in cross section is centrally connected to the front end of a chain 18 preferably composed of flat links and secured at its front end to the said shaft or roller by means of an eye bolt 19. The rear end of the chain is linked into an eye of a coupling member 20 consisting of a metallic bar or strip doubled to form the eye 21 and to provide two sides between which is adjustably secured a rear approximately V-shaped rod 22. The sides of the V-shaped rod 22 are bent upwardly to provide arms 23 extending upwardly in rear of the rear axle 24 and secured to the rear bolster by eye bolts 26 or other suitable fastening devices. The coupling member 20 is provided at intervals with perforations 27 through which passes a pin 28 which engages the V-shaped rod at the loop or apex thereof. The pin 28 is adapted to be adjusted longitudinally of the coupling member to vary the effective length of the connection between the central portion of the transverse shaft or roller and the running gear. When the roller is rotated or partially turned on the pivot formed by the lower ends of the links 4, by the operating mechanism hereinafter explained, the flat chain is partially wound around the central portion of the shaft or roller, which is thereby drawn toward the wheels, the links swinging upwardly and rearwardly during such movement. Through the double eccentric action of the shaft or roller the brake shoes are caused to bind tightly against the wheels with the desired amount of friction. In order to increase the effect of the central connection between the transverse shaft or roller and the running gear the shaft or roller is equipped with a block 30 mounted on the said roller in rear of the eye bolt 19 and adapted to be interposed between the chain and the roller.

This is adapted to increase the braking action of the shoes on the hind wheels. Also the central flexible connections may be adjusted to suit the character of the load and in practice the brake will be constructed in various sizes to adapt it for various kinds of vehicles. The transverse shaft or roller is equipped with an arm 31 preferably of approximately V-shape and secured at the terminals of its sides to the roller at diametrically opposite points and forming an upper loop 32 for the reception of a pivot 33 of a weighted lever 34 fulcrumed intermediate of its ends on the arm 31 and carried by the same in the movements thereof and having opposite extending arms which are normally maintained in a vertical position when the brake is off the wheels. The weighted lever assists in loosening the connection between the arm 31 and the operating means and facilitates the movement of the brake shoes from the wheels. The weighted lever may be connected by a rod 35 with an operating lever 36 of the ordinary construction and the rod 35 is detachably secured to the weighted lever and a rope or any other suitable operating means may be connected with the weighted lever to enable the brake to be operated when the running gear is employed in connection with a hay rack or when a high load or the like prevents the use of the ordinary operating means.

The ends of the transverse supporting bar 3 are preferably connected with the sides of a wagon body 37 by stays consisting of chains 38 linked at their lower ends into approximately L-shaped plates 39 and connected at their upper ends to substantially triangular loops 40 hinged at 41 to plates 42 and having their lower portions 43 bent outwardly to receive the upper ends of the said chains 38. This provides a detachable connection when it is desired to remove the wagon body from the running gear.

What is claimed is:—

1. A brake of the class described including a transverse roller, links supporting the roller and eccentrically pivoted to the same to permit independent rotary movement of the roller during the oscillation of the links, brake shoes pivoted to the roller and means for partially rotating the roller and for causing a simultaneous rearward movement of the same.

2. A vehicle brake including a transverse roller, links supporting the roller and pivotally connected thereto at the back thereof eccentrically of the same to permit the roller to rotate independently of the swinging movement of the links, brake shoes pivotally connected to the ends of the roller eccentrically of the same at points spaced from the pivots of the links and means for partially rotating the roller and for causing a simultaneous rearward movement of the same.

3. A vehicle brake of the class described including a transverse shaft or roller, pivots projecting from the ends of the shaft or roller and extending into the same and arranged eccentrically, brake shoes mounted on the said pivots, transverse fastening devices piercing the shaft or roller and the inner portions of the pivots and supporting links secured to the shaft or roller by the said fastening devices.

4. A vehicle brake of the class described including a transverse roller having eccentrically arranged pivots, brake shoes pivoted intermediate of their ends to the roller by the said pivots and provided with lower weighted portions, supporting links pivotally connected with the roller eccentrically thereof at points spaced from the pivots of the brake shoes and permitting the roller to rotate during the oscillation of the links and means for partially rotating the roller and for causing a simultaneous rearward movement of the same.

5. A vehicle brake of the class described including a transverse roller, supporting links eccentrically pivoted to the roller and the back of the same and permitting the roller to rotate independently of the links during the swinging movement thereof, brake shoes eccentrically pivoted to the ends of the roller, a flexible connection wound around the roller and means for operating the flexible connection to rotate the roller and cause a simultaneous rearward movement of the same.

6. A vehicle brake of the class described including a shaft or roller, provided with brake shoes, supporting means for the shaft or roller, a chain connected with the roller and arranged to be wound around the same, a coupling member connected with the chain and having spaced sides provided at intervals with perforations and an approximately V-shaped rod adjustably secured to the coupling member by fastening means arranged to engage the said perforations.

7. A vehicle brake of the class described including a transverse shaft or roller, provided with brake shoes, a flexible connection secured to the shaft or roller and arranged to be wound around the same, a coupling member composed of spaced sides provided at intervals with perforations and connected with the flexible connection, an approximately V-shaped rod extending between the sides of the coupling member and a pin passing through the coupling member and engaging the V-shaped rod.

8. A vehicle brake of the class described including a transverse shaft or roller provided with brake shoes, links supporting the shaft or roller and eccentrically connected with the same, a flexible connection arranged to be wound around the said shaft or roller for forcing the same rearwardly, an arm connected with the shaft or roller, a lever pivoted at its intermediate point to the arm and having one end weighted and operating means connected with the other end of the lever.

In testimony whereof I affix my signature in presence of two witnesses.

BYRON PICKERING.

Witnesses:
H. M. BREAKER,
CORSON FARMER.

Copies of this patent may be obtained for five cents each, by addressing the "Commissioner of Patents, Washington, D. C."